United States Patent [19]

Edahiro et al.

[11] Patent Number: 5,199,015
[45] Date of Patent: Mar. 30, 1993

[54] OPTICAL RECORDING/REPRODUCING DEVICE HAVING MEANS FOR ADJUSTING SERVO LOOP GAIN AND PHASE CHARACTERISTICS

[75] Inventors: Yasuaki Edahiro, Hirakata; Katsuya Watanabe, Suita, both of Japan

[73] Assignee: Matsushita Electric Industrial Co., Ltd., Osaka, Japan

[21] Appl. No.: 716,982

[22] Filed: Jun. 18, 1991

[30] Foreign Application Priority Data

Jun. 18, 1990 [JP] Japan .................................. 2-159034

[51] Int. Cl.⁵ .............................................. G11B 7/09
[52] U.S. Cl. .............................. 369/44.25; 369/44.36; 369/44.41
[58] Field of Search ................ 369/44.36, 44.35, 44.34, 369/44.31, 44.29, 44.22, 44.25, 44.41, 44.11, 54, 58

[56] References Cited

U.S. PATENT DOCUMENTS

| | | | |
|---|---|---|---|
| 4,755,980 | 7/1988 | Yoshimaru et al. | 369/44.25 |
| 4,890,273 | 12/1989 | Takeuchi et al. | 369/44.36 |
| 4,942,564 | 7/1990 | Hofer et al. | 369/58 |
| 5,084,849 | 1/1992 | Ishii et al. | 369/44.35 |

FOREIGN PATENT DOCUMENTS

0247829A1 12/1987 European Pat. Off. .
0363195A2 4/1990 European Pat. Off. .

Primary Examiner—Wayne R. Young
Assistant Examiner—Muhammad Edun
Attorney, Agent, or Firm—Wenderoth, Lind & Ponack

[57] ABSTRACT

An optical recording and playback device for irradiating a light beam spot on a track of a data carrying medium at a target condition includes a servo error signal detector for detecting a deviation, such as defocus amount or off-tracking amount, of the light beam spot from the target condition. A servo circuit defining a servo loop with the servo error signal detector is provided for generating drive signals for driving actuators which control the movement of the light beam generator. A reference signal generator generates a reference signal to the servo loop. A complex amplitude calculation is carried out for calculating a complex amplitude of the frequency component of the reference signal applied to the servo loop. From the complex amplitude of the previously stored reference signal, a gain characteristics of the servo loop and a servo loop phase are calculated. An adjustment circuits are provided for changing the gain characteristics of the servo loop and the servo loop phase.

19 Claims, 9 Drawing Sheets

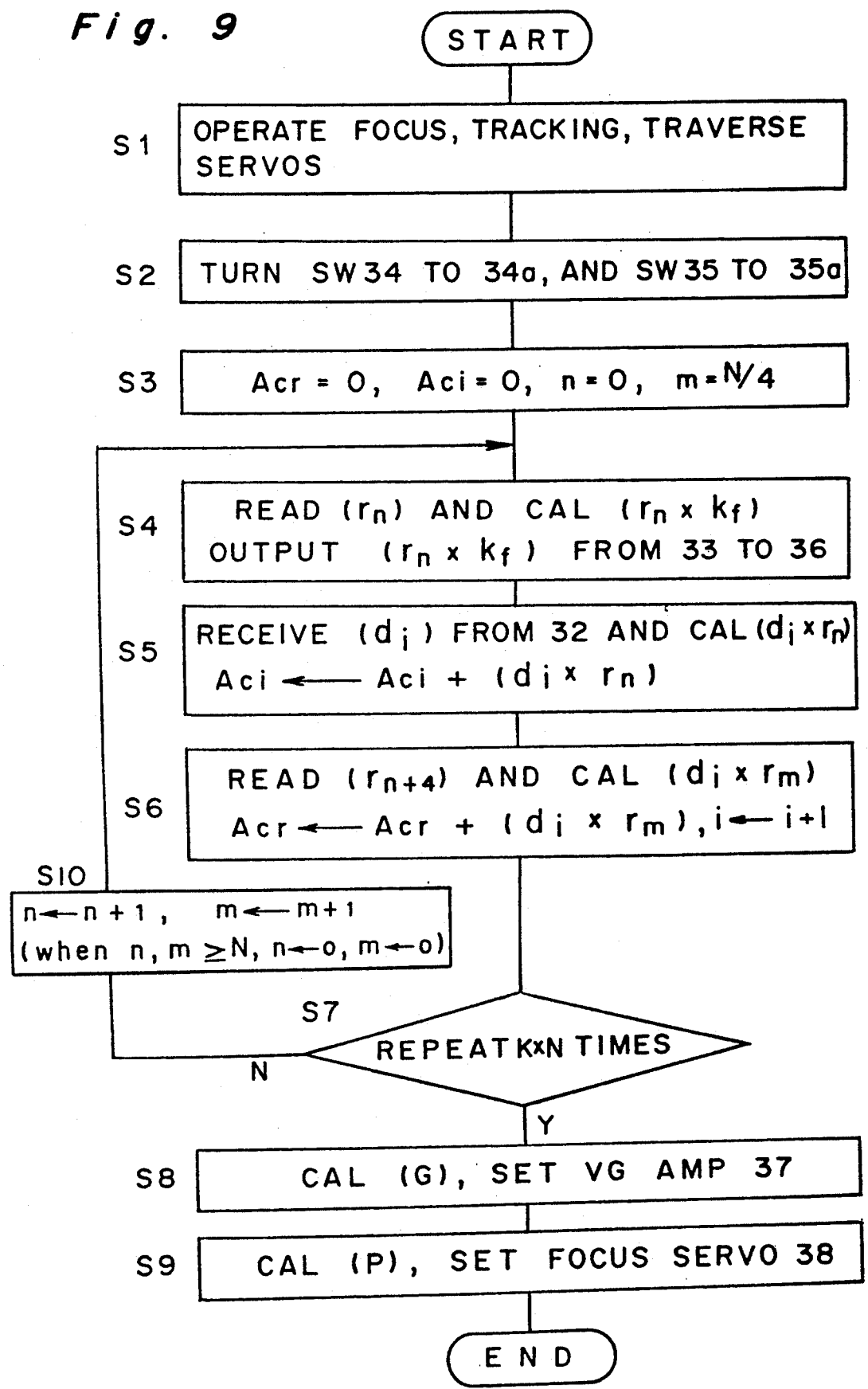

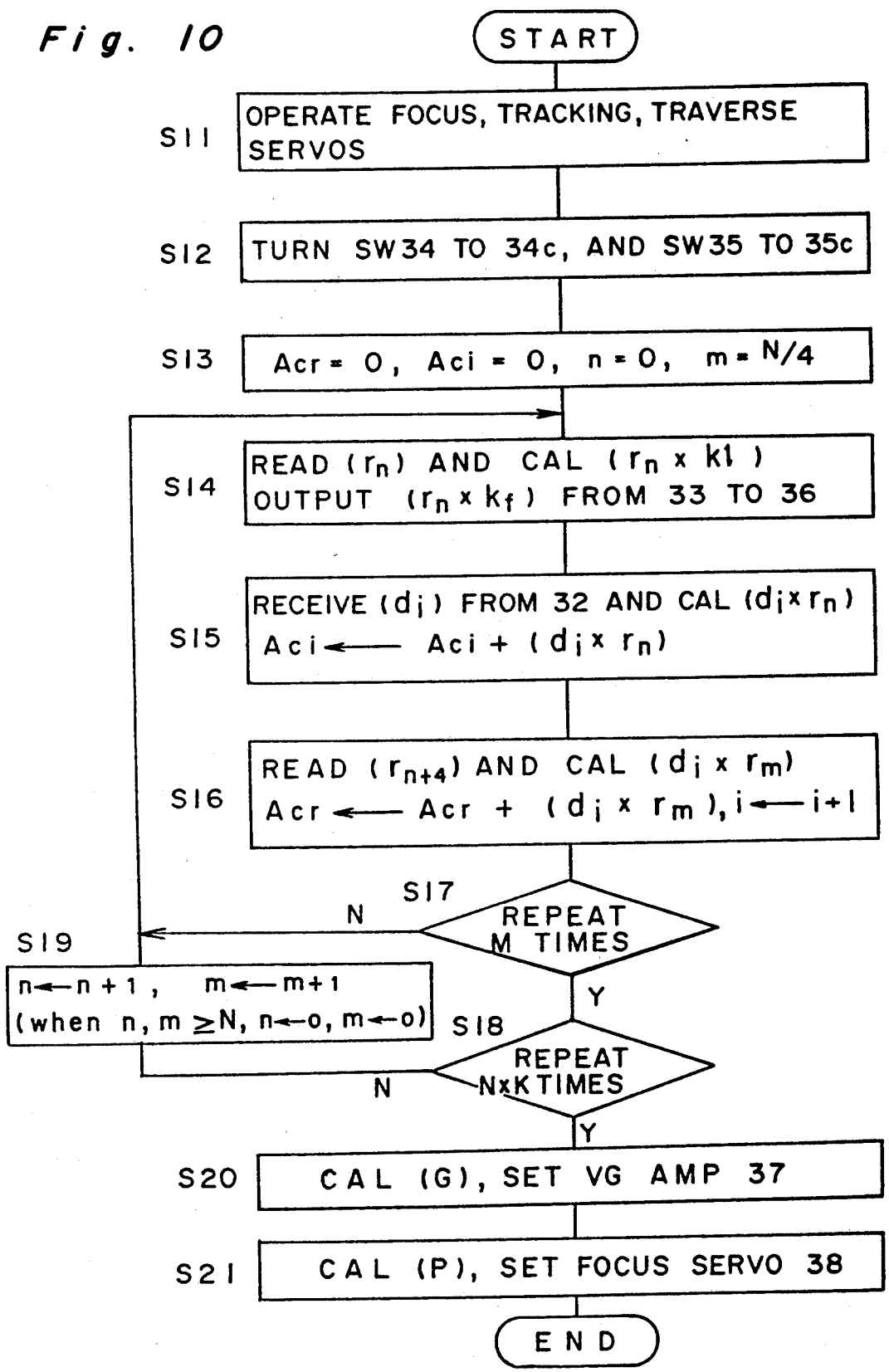

OPTICAL RECORDING/REPRODUCING DEVICE HAVING MEANS FOR ADJUSTING SERVO LOOP GAIN AND PHASE CHARACTERISTICS

BACKGROUND OF THE INVENTION

1. Field of the Invention

The present invention relates to an optical recording and playback device which records and reads code information, and audio and video information using an optical read/writable medium by means of a semiconductor laser or other light source.

2. Description of the Prior Art

A prior art optical recording and playback device is shown in FIG. 1, which uses an optical disk 1 on which a data recording/playback track 2 is formed. The light beam 4 emitted by the laser diode 17 is converted to a parallel beam by the collimator lens 18, passed through the half mirror 19, and focused to a spot 3 by the objective lens 5 on the optical disk 1. The light reflected from the optical disk 1 passes the objective lens 5 and is partially reflected by the half mirror 19 to the half mirror 20, which splits the beam in two. The reflected light from the half mirror 20 passes the coupling lens 21 and is converted to an electrical data read signal by the photodetector 22 which is applied to the playback signal detector 7. The light which passes through the half mirror 20 is again split by another half mirror 23.

The light reflected by the half mirror 23 passes the coupling lens 24 and is partially blocked by knife edge 25, the unblocked part is incident upon a ½ divided photodetector 26, and an electrical focus error signal is detected by a differential amplifier 8. Phase compensation and other processing is applied to the focus error signal by the focus servo circuit 9, and the light beam 4 is focused on the recording medium surface of the optical disk 1 by moving the objective lens 5 in a roughly vertical perpendicular direction to the optical disk 1 surface by means of the focus actuator 10 according to the output of the focus servo circuit 9.

The light passing through the half mirror 23 passes the coupling lens 27 and is incident upon the ½ divided photodetector 28, and is converted to an electrical tracking error signal by the differential amplifier 11. Phase compensation and other processing is applied to the tracking error signal by the tracking servo circuit 12, and the spot 3 is tracked along the data recording/playback track 2 by moving the objective lens 5 laterally in an approximately perpendicular direction to the track 2, i.e., perpendicular direction to the sheet when viewed in FIG. 1, by means of a tracking actuator 13 based on the output of the tracking servo circuit 12.

The output of the tracking servo circuit 12 is also input to the traverse servo circuit 14, which applies phase compensation and other processing before outputting the signal. The traverse servo circuit 14 is used to drive the linear motor 15 to move the optical head 6 fixed to the transport block 16, the focus actuator 10, and the tracking actuator 13 in a roughly laterally perpendicular direction to the signal recording/playback track 2, as effected when jumping a number of tracks.

In the prior art optical recording and playback device, a light beam generated by a semiconductor laser or similar light source is focused on a disk-shaped recording medium rotating at a predetermined velocity to record and playback a signal thereon. This recording medium typically has a spiral recording track or concentric recording tracks approximately 1.2 $\mu$m wide at an approximately 1.6 $\mu$m pitch. To record a signal on this track or read a recorded signal back from this track, a focusing servo focuses the light beam to a microscopic light spot with a maximum 1 $\mu$m diameter on the disk surface, a tracking servo causes the light spot to track the signal track, and a traverse servo moves the optical head in a direction approximately perpendicular to the signal track.

However, to stabilize servo operation for the prior art optical recording and playback device as thus described, a technician must measure the frequency characteristics of the focusing, tracking, and traverse servo loops using a spectrum analyzer or other frequency characteristics analyzer, and adjust the potentiometers provided to change the gain of the servo signal processing circuits to the specified servo gain level. In addition to this servo gain adjustment procedure being time consuming, when the characteristics of the servo error signal detection sensitivity of the optical head, the actuator, and the linear motor change due to temperature changes, the servo loop gain also changes, resulting in an unstable servo operation.

SUMMARY OF THE INVENTION

Therefore, an object of the present invention is to provide an optical recording and playback device which automatically adjusts to a predetermined value the loop gain and phase characteristics of the focusing servo, tracking servo, and traverse servo.

To achieve the aforementioned object, an optical recording and playback device according to the present invention, for irradiating a light beam spot on a track of a data carrying medium at a target condition, comprises: servo error signal detection means for detecting a deviation of the light beam spot from the target condition; servo means defining a servo loop with said servo error signal detecting means for moving the light spot beam to and holding the light spot beam at the target condition; reference signal generator for generating a reference signal to said servo loop; complex amplitude calculation means for calculating the complex amplitude of the frequency components of the reference signal in the detected servo error signal; means for calculating a gain characteristics of the servo loop from the output of the complex amplitude detection means and the previously stored complex amplitude of the reference signal; and an adjustment means for changing the gain characteristics of the servo loop.

In the servo assembly of an optical recording and playback device constructed as described above, while driving the servos based on the servo error signal detected by the servo error signal detector, a sine wave, single frequency reference signal is applied to the servo loop by the reference signal generator, the complex amplitude of the frequency component of the reference signal in the detected servo error signal by an orthogonal phase heterodyne detection, the servo loop phase and gain characteristics are calculated from the output of the complex amplitude means and the complex amplitude of the previously stored reference signal applied to the servo loop, and a command is applied to the phase/gain adjustment means by the control means according to the operator output to set the servo loop phase and gain characteristics to the predetermined values.

BRIEF DESCRIPTION OF THE DRAWINGS

The present invention will become more fully understood from the detailed description given below and the accompanying diagrams wherein:

FIG. 5b is a graph showing different phase signals produced from the circuit of FIG. 5a;

FIG. 9 is a flow chart showing an operation of the focusing servo and tracking servo; and FIG. 10 is a flow chart showing an operation of the traverse servo.

DESCRIPTION OF PREFERRED EMBODIMENTS

Figure 1:
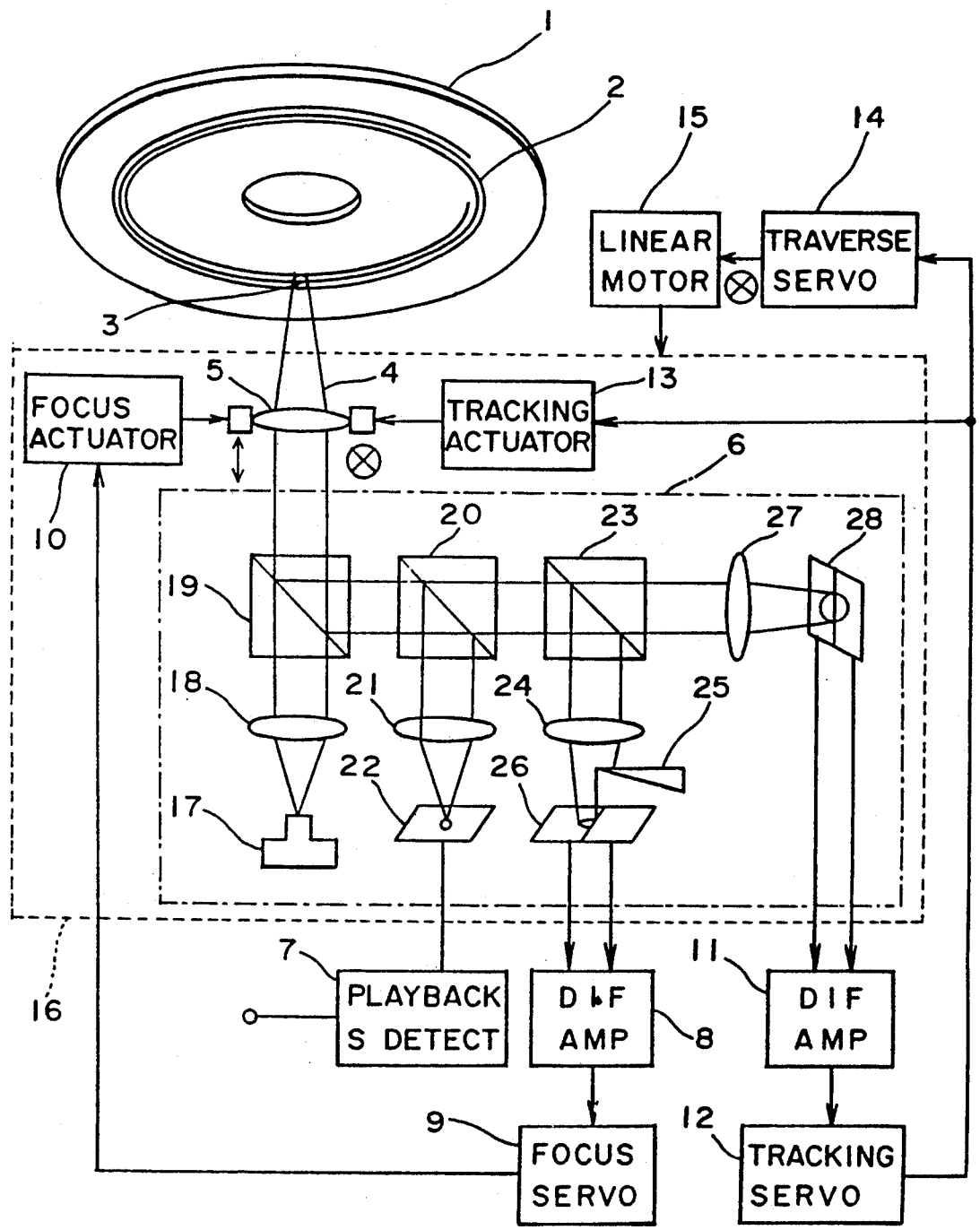
FIG. 1 is a block diagram of a prior art optical recording and playback device.
Figure 2:
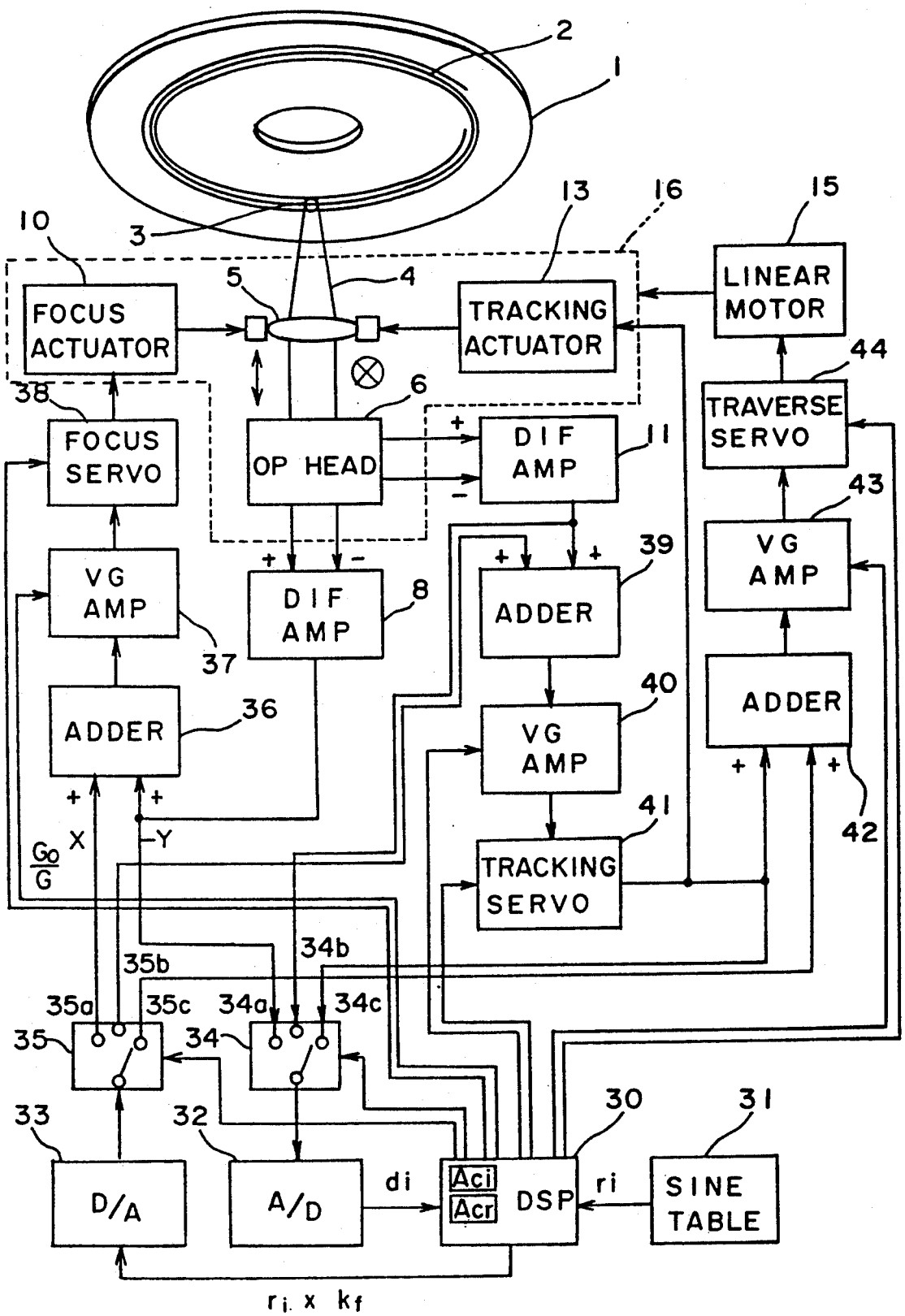
FIG. 2 is a block diagram of an optical recording and playback device according to a preferred embodiment of the present invention.
Figure 3:
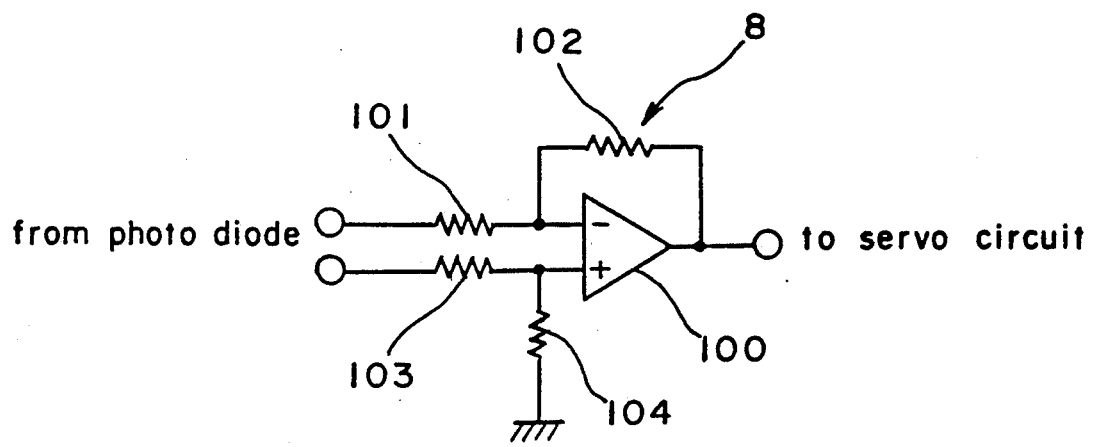
FIG. 3 is a circuit diagram of a differential circuit employed in the circuit of FIG. 2.

Referring to FIG. 2, a block diagram of an optical recording and playback device according to a preferred embodiment of the present invention is shown, wherein a digital signal processor (hereinafter DSP) is used for the control means. As shown in FIG. 2, the optical recording and playback device comprises an optical disk 1, signal recording/playback track 2, optical spot 3, light beam 4, objective lens 5, optical head 6, differential amplifier 8, differential amplifier 11, focus actuator 10, tracking actuator 13, linear motor 15, and transport block 16, each of these components being the same as those in the prior art optical recording and playback device described above. A circuit diagram of an example of differential amplifier 8 is shown in FIG. 3, wherein reference number 100 is an operational amplifier and 101, 102, 103, and 104 are resistors.

Figure 4:
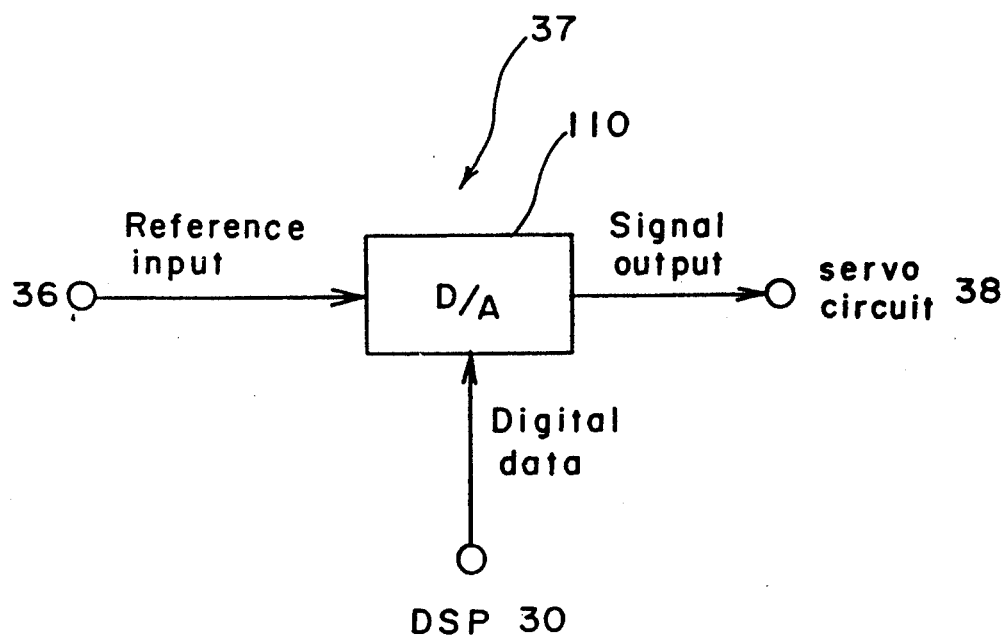
FIG. 4 is a circuit diagram of a variable gain amplifier employed in the circuit of FIG. 2.

As shown in FIG. 2, the optical recording and playback device also comprises a digital signal processor 30, sine wave data table 31, A/D convertor 32 and D/A convertor 33, a switch 34 to switch the input to the A/D convertor 32 as controlled by the DSP 30, a switch 35 to switch the output from the D/A convertor 33 as controlled by the DSP 30, an adder 36 for adding the output from differential amplifier 8 and the output from the switch 35, an adder 39 for adding the output from differential amplifier 11 and the output from the switch 35, and an adder 42 for adding the output from tracking servo circuit 41 and the output from the switch 35. The variable gain amplifiers 37, 40 and 43 change the respective gain levels thereof controlled by the DSP 30. An example of the variable gain amplifier 37 is shown in FIG. 4. This variable gain amplifier uses a multiplying type D/A converter 110, which employs ladder resistors and a switch. A single input to the reference input of the D/A converter 110 is varied in response to the digital data applied to convertor 110 from DSP 30 such that, for example, when a digital data indicative of 5 is applied to D/A 110 from DSP 30, the reference input signal is amplified by 5 times, and similarly when a digital data indicative of 10 is applied to D/A 110 from DSP 30, the reference input signal is amplified by 10 times.

Figure 5A:
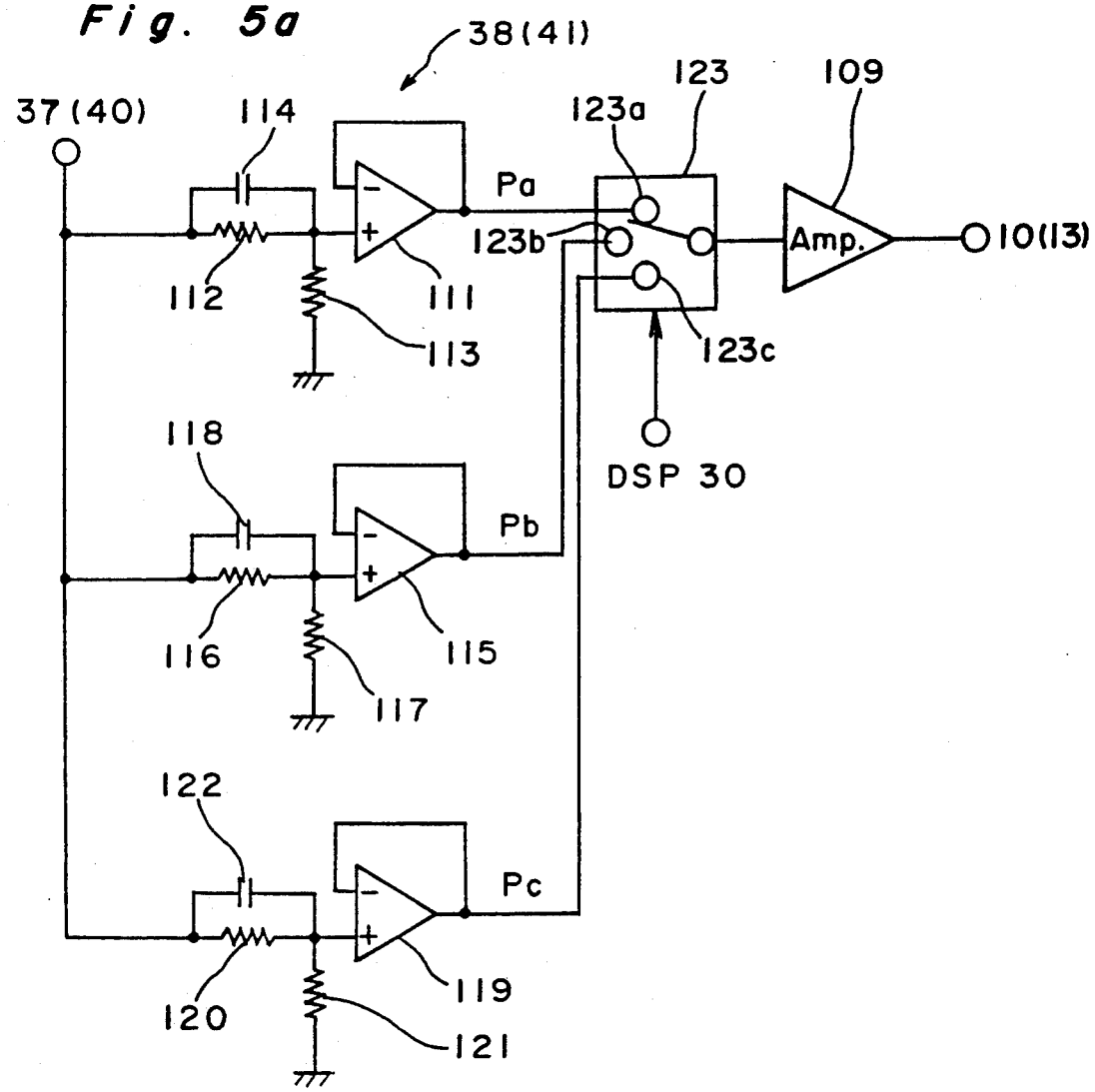
FIG. 5a is a circuit diagram of a basic focusing servo circuit and a tracking servo circuit employed in the circuit of FIG. 2.
Figure 5B:
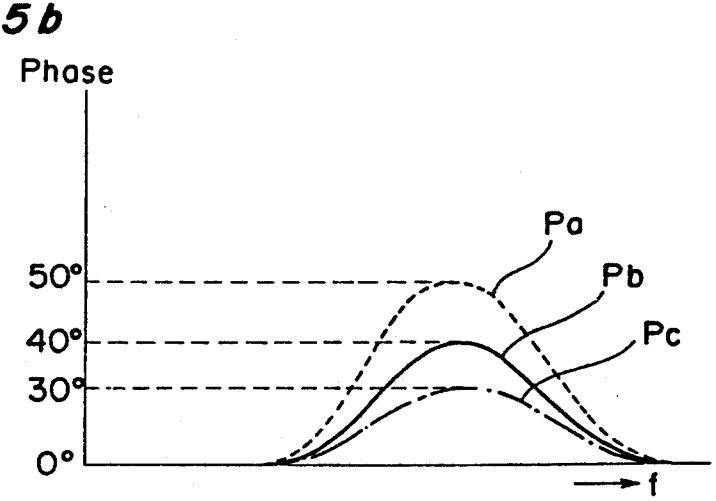

The focusing servo circuit 38 and the tracking servo circuit 41 both switch the respective phase characteristics thereof according to DSP 30 control, and each have a basically equivalent circuit design. An example of the focusing servo circuit 38 and tracking servo circuit 41 is shown in FIG. 5a which is a type that can present three different phase characteristics, such as shown by curves Pa, Pb and Pc in FIG. 5b. As shown in FIG. 5a, the servo circuit comprises operational amplifiers 111, 115 and 119, resistors 112, 113, 116, 117, 120 and 121, capacitors 114, 118 and 122, and a switch 123 which switches the input to the power amplifier 109 between operational amplifier 111, operational amplifier 115, and operational amplifier 119 as controlled by the DSP 30. The servo circuit comprises three phase compensation circuits: one formed by operational amplifier 111, resistors 112 and 113, and capacitor 114; one by operational amplifier 115, resistors 116 and 117, and capacitor 118; and one by operational amplifier 119, resistors 120 and 121, and capacitor 122. The three phase compensation circuits have the same gain but different phase characteristics at the gain crossover frequency $f_0$ of the servo loop. Thus, when terminal 123a is selected by DSP 30, a signal having a phase characteristic Pa shown in FIG. 5b is produced so that the phase difference of 50° is obtained at the gain crossover frequency $f_0$. Similarly, when terminal 123b or 123c is selected by DSP 30, a signal having a phase characteristic Pb or Pc shown in FIG. 5b is produced so that the phase difference of 40° or 30° is obtained at the gain crossover frequency $f_0$. It is preferable to have a phase difference of about 40°-30° at the gain crossover frequency $f_0$, so that when a phase is detected as having a degree smaller than the required degree, e.g., 40°, DSP 30 selects terminal 123a to increase the phase difference. On the other hand, when the detected phase is greater than the required degree 50°, DSP selects terminal 123c to decrease the phase difference.

Figure 6:
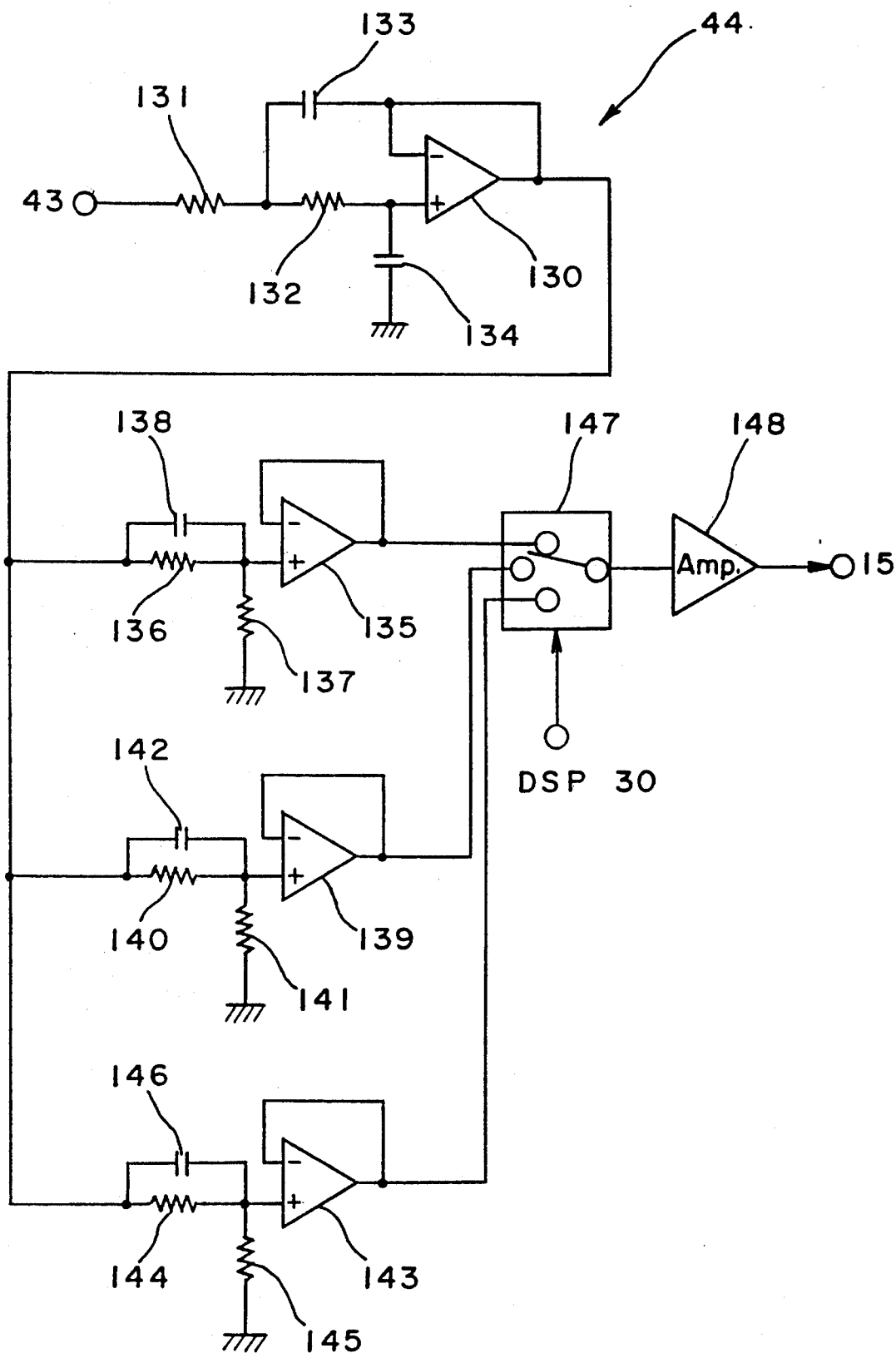
FIG. 6 is a circuit diagram of a traverse servo circuit employed in the circuit of FIG. 2.

The traverse servo loop 44 switches the phase characteristics as controlled by the DSP 30. An example of the traverse servo loop 44 is shown in FIG. 6. The traverse servo circuit shown in FIG. 6 switches between three types of circuit phase characteristics, in a similar manner to that shown in FIG. 5b. As shown in FIG. 6, the servo circuit 44 comprises operational amplifiers 130, 135, 139, and 143, resistors 131, 132, 136, 137, 140, 141, 144 and 145, capacitors 133, 134, 138, 142, and 146, and a switch 147 which switches the input to the power amplifier 148 between operational amplifiers 135, 139, and 143 as controlled by the DSP 30. The servo circuit comprises three phase compensation circuits: one formed by operational amplifier 135, resistors 136 and 137, and capacitor 138; one by operational amplifier 139, resistors 140 and 141, and capacitor 142; and one by operational amplifier 143, resistors 144 and 145, and capacitor 146. The three phase compensation circuits have the same gain but different phase characteristics at the gain crossover frequency $f_0$ of the servo loop. The circuit formed by the operational amplifier 130, resistors 131 and 132, and capacitors 133 and 134 has frequency characteristics approximately equal to those of the tracking actuator, and estimates the displacement from the midpoint of the tracking actuator.

An optical recording and playback device according to the preferred embodiment of the present invention constructed as described above operates as follows.

Figure 8A:
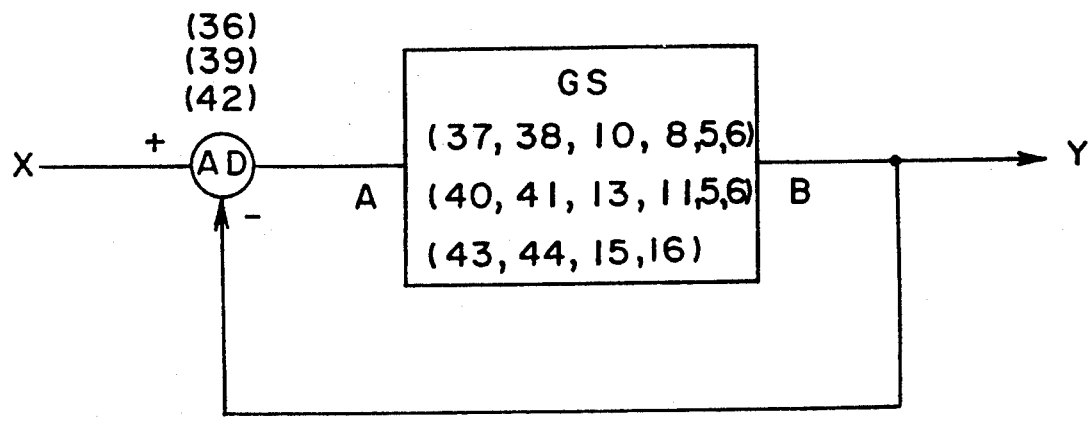
FIG. 8a is a diagram of servo system of the circuit of FIG. 2.

As shown in FIG. 8a, a servo control system generally includes an adder AD and an operating arrangement GS. In the circuit of FIG. 2, there are three servo control systems: a focus servo system defined by elements 37, 38, 10, 8, 5 and 6 for the focus servo arrangement and adder 36; a tracking servo system defined by elements 40, 41, 13, 11, 5 and 6 for the tracking servo arrangement and adder 39; and a traverse servo system defined by elements 43, 44, 15 and 16 for the traverse servo arrangement and adder 42. Each servo arrangement has its input A and output B, and also each servo system has its input X and output Y, wherein X and Y are complex numbers. The description hereinbelow is particularly directed to the focus servo system, but is also applicable to the other two servo systems.

The aim of the focus servo system according to the present invention is to maintain the gain G of the focus servo arrangement to be equal to 1 with a crossover frequency being fixed at $f_0$, as indicated below, $$G = \frac{B}{A} = 1 \quad (1)$$

wherein $$\frac{B}{A} = \frac{Y}{X-Y} \quad (2)$$

In other words, the servo system of the present invention controls the gain of the servo loop by changing the gain in the variable gain amplifier 37 to maintain the crossover frequency at $f_0$ at which 0dB gain is obtained.

Figure 8B:
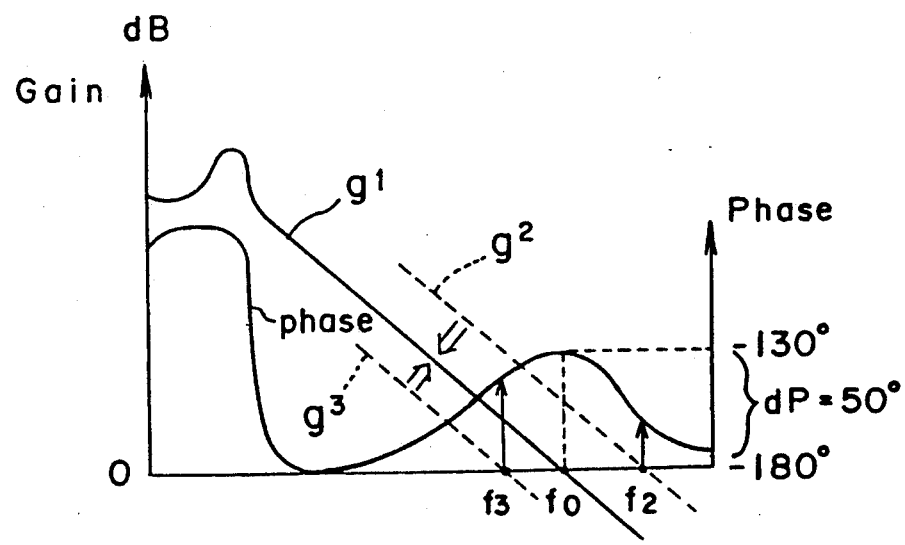
FIG. 8b is a graph showing gain characteristics and phase characteristics of the servo system.

When the gain characteristics deviate from a desired characteristics, such as shown by line g1 in FIG. 8b, to undesired characteristics, such as shown by line g2 or g3, due to the temperature change and/or variation in the constructing parts, the servo system of the present invention automatically returns the gain characteristics to the desired characteristics g1. For example, when the gain characteristics deviates from g1 to g3, the gain of the servo loop is decreased by variable gain amplifier 37 to return the gain characteristics to g1. In other words, the crossover frequency at which the 0dB gain is obtained in shifted from $f_2$ to $f_0$. On the other hand, when the gain characteristics deviates from g1 to g3, the gain of the servo loop is increased by variable gain amplifier 37 to return the gain characteristics to g1. In other words, the crossover frequency at which the 0dB gain is obtained is shifted from $f_3$ to $f_0$.

When the gain characteristic line is changed, e.g., from g1 to g2, the phase difference dP may be change to be greater or smaller than the preferable range 40°-50°. In such a case, according to the present invention, the focus servo circuit 38 is also activated to change the phase characteristics as shown in FIG. 5b, in a manner described above.

The focusing servo characteristics adjustment operation is further described with reference to the flow chart shown in FIG. 9.

Figure 7:
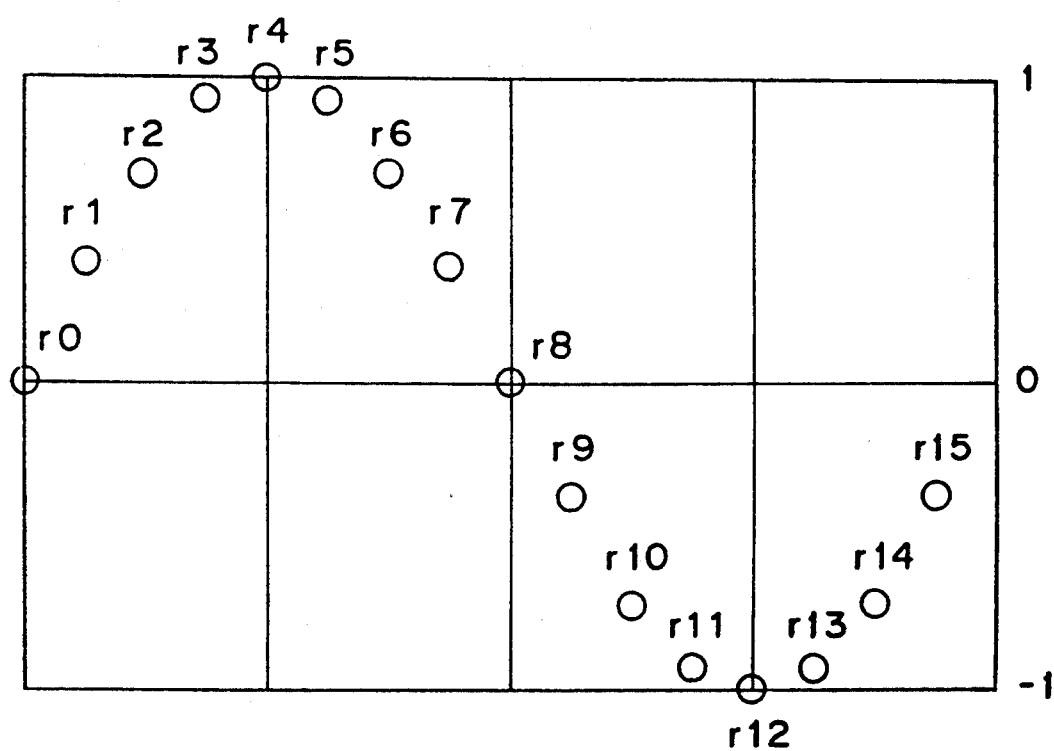
FIG. 7 is a graph showing a data array in a sine wave data table employed in the circuit of FIG. 2.

First, the focusing servo, tracking servo, and traverse servo are made operative (step S1). Then, by the control of DSP 30, the switch 34 is turned to output 34a which is connected to the output of the differential amplifier 8, and the switch 35 is turned to output 35a which is connected to the adder 36 (step S2). The memory Acr in DSP 30 for storing the real part of output Y (FIG. 8a) and the memory Ari in DSP 30 for storing the imaginary part of output Y are reset to zero, and also address counter n for counting the $r_n$ in the sine table 31 shown in FIG. 7 is reset to zero, so as to be ready to start counting a sine wave. Furthermore, m=N/4 is set, wherein N is the maximum of the address counter in the sine table of FIG. 7, so as to be ready to start counting a cosine wave (step S3).

Then, the DSP 30 reads the numeric data for the sine wave from the sine wave data table 31. The sine wave data table 31 may be formed by a ROM or RAM device. FIG. 7 is a chart of the data in a 16-point data sine wave data table 31 where the $r_n$ (n=0, 1, 2, ..., N) values are stored in the ROM or RAM device. The DSP 30 sequentially reads the sine wave data table 31 at a constant time interval, and a D/A convertor 33 generates an analog signal from the read data to generate the sine wave signal $r_n \cdot kf$, wherein kf is a constant (step S4). The sine wave signal $r_n \cdot kf$ is used as the input X (FIG. 8a) which is applied to adder 36.

In the first cycle operation, the DSP 30 reads the data from the sine wave data table 31 in sequence from $r_0$, multiplies the data by a predetermined coefficient kf and a D/A convertor 33 converts the signal to an analog signal which is output as the reference signal $X = r_0 \cdot kf$. The reference signal X is added to the focus error signal $-Y = d_0$ to obtain $r_0 \cdot kf + d_0$. In the meantime, the DSP 30 reads the focus error signal $-Y = d_0$ which is converted to a digital signal by the A/D convertor 32. Then, in DSP 30, the focus error signal $-Y = d_0$ is multiplied by the $r_0$ read from the sine wave data table 31 and writes the value $d_0 \cdot r_0$ into memory Aci representing the imaginary part of $-Y$ (step S5). Furthermore, the DSP 30 multiplies $r_4$ representing a cosine as read from the sine wave data table 31 by the read focus error signal $-Y - d_0$, and writes the result $d_0 \cdot r_4$ into memory Acr representing the real part of $-Y$ (step S6). If N is the number of data values for one complete sine wave cycle, then the cosine wave signal can be obtained by reading the sine wave data table 31 from a point which is offset N/4.

The DSP 30 then waits a predetermined time Ts before reading the next data $r_1$ from the sine wave data table 31. This data is multiplied by the coefficient kf and is converted to an analog signal by the D/A convertor 33 and added to the focusing servo error signal $-Y = d_1$ to obtain $r_1 \cdot kf + d_1$. In the meantime, the DSP 30 reads the focus error signal $d_1$ digitally converted by the A/D convertor 32, multiplies this signal by the $r_1$ read from the sine wave data table 31, adds the result $d_1 \cdot r_1$ to the memory Aci which then adds the new result $d_1 \cdot r_1$ to old results $d_0 \cdot r_0$ so far added. Next, the DSP 30 multiplies the focus error signal $d_1$ by the $r_5$ value read from the sine wave data table 31, adds the result $d_1 \cdot r_5$ to the value $d_0 \cdot r_4$ already stored in memory Acr.

The above operation is thereafter repeated while advancing the respective addresses r2, r3, ... to complete one sine waveform and r6, r7, ... to complete one cosine waveform. Such a calculation using one complete sine wave or one complete cosine wave is repeated K times (step S7) to accumulate data in memories Acr and Aci.

After the above operation, a complex amplitude of the frequency component of the reference signal in the focus error signal can be obtained by dividing the data accumulated after K cycles of the sine wave by ($N \times K \div 2$). This operation is substantially the same as orthogonal phase heterodyne detection.

Thus, if the complex amplitude of the reference signal, which is the value of the sine wave data table 31 multiplied by a specific coefficient kf, is Xc, and the complex amplitude of the frequency component of the reference signal in the detected focus error signal is Yc, then the complex expression Gc of the servo loop gain in the frequency of the applied reference signal can be obtained using the equation:

$$Gc = \frac{Yc}{Xc + Yc}. \quad (3)$$

The real number component Xr of the reference signal is $$Xr = 0 \times kf \quad (4)$$

and the imaginary number component Xi is defined as $$Xi = -1 \times kf. \quad (5)$$

The real number component Yr of the detected signal is $$Yr = \frac{Acr}{N \times K + 2} \quad (6)$$

and the imaginary number component Yi is defined as $$Yi + \frac{Aci}{N \times K + 2}. \quad (7)$$

The gain G is obtained from the real number Gr and imaginary number Gi components of Gc using the equation $$G = \sqrt{Gr^2 + Gi^2}. \quad (8)$$

To adjust the detected gain G to the preset gain G0, the DSP 30 obtains G0/G and applies the result to the variable gain amplifier 37 to adjust the servo loop gain to the desired value (step S8).

The phase P of the servo loop in the frequency of the applied reference signal is obtained by the DSP 30 as $$P = \tan^{-1}\frac{Gi}{Gr}. \quad (9)$$

To adjust detected phase P to the specified phase, the DSP 30 applies a command to the focusing servo circuit 38 to change the servo loop phase characteristics to the phase compensation circuit with a greater phase advance, such as from terminal 123b to terminal 123a, when the measured phase advance is less than the specified value, to the phase compensation circuit with a smaller phase advance, such as from terminal 123b to terminal 123c, when the measured phase advance is greater than the specified value, and to hold the present phase compensation circuit when the measured phase advance is approximately equal to the specified value, thus adjusting the phase characteristics of the servo loop to approximately the specified value (step S9).

It is to be noted that the phase characteristics can also be switched by determining the shift in the phase characteristics of the servo loop directly from the Gi/Gr value without calculating $\tan^{-1}$.

The gain and phase characteristics of the tracking servo loop can also be adjusted with the same operation as that of the focusing servo adjustment by the switch 34 being turned to terminal 34b for the connection to the differential amplifier 11 and the switch 35 being turned to terminal 35b for the connection to the adder 39, as controlled by the DSP 30.

For adjustment of the tracking servo, the sine wave data table may be the same as that used for focus servo adjustment, or a different one may be used. Furthermore, by changing the time interval Ts at which data is read from the table, a reference signal with a frequency different from that used in focus servo adjustment can be obtained. The frequency can also be changed by outputting the values of the sine wave data table 31 in a non-consecutive sequence, or by outputting the same sine wave data table 31 data plural times. In addition, the coefficient kf and repeat K values may also differ from those used during focus servo adjustment.

Next is described traverse servo adjustment in the preferred embodiment, in connection with FIG. 10.

In operation, at first, the focusing servo, tracking servo, and traverse servo are made operative (step S11). Then, the switch 34 is turned to terminal 34c for connection with the output of the tracking servo circuit 41, and the switch 35 is turned to terminal 35c for connection with the adder 42, based on DSP 30 control (step S12). Then, various parameters are reset (step S13).

Then, the DSP 30 reads the numeric data for the sine wave from the sine wave data table 31 in sequence from $r_0$, multiplies the data by a predetermined coefficient kl and a D/A convertor converts the signal to an analog signal which is output as the reference signal. The reference signal is added to the tracking drive signal, which is the output of the tracking servo circuit 41, by the adder 42. The DSP 30 reads the tracking drive signal $d_0$ converted to a digital signal by the A/D convertor 32, multiplies this signal by the $r_0$ read from the sine wave data table 31 and writes the value into memory Aci. Next, the DSP 30 multiplies the $r_4$ read from the sine wave data table 31 by the read tracking drive signal $d_0$, and writes the result into memory Acr.

The DSP 30 then waits a predetermined time Ts before re-reading the data $r_0$ from the sine wave data table 31. The data is converted to an analog signal by the D/A convertor and added to the tracking drive signal. The DSP 30 reads the tracking drive signal $d_1$ digitally converted by the A/D convertor 32, multiplies this signal by the $r_0$ value read from the sine wave data table 31, adds the result to the value stored to memory Aci, and thereafter the value is accumulated in memory Aci. Next, the DSP 30 multiplies the tracking drive signal $d_1$ by the $r_4$ read from the sine wave data table 31, adds the result to the value stored to memory Acr, and thereafter the value is accumulated in memory Acr. After repeating this sequence M times, the value read from the sine wave data table 31 is advanced one, and the same calculations are performed using the values $r_1$ and $r_5$.

The above operation is thereafter repeated while advancing the respective addresses $r_2, r_3, \ldots$ and $r_6, r_7, \ldots$ by one with each repetition until reaching $r_{15}$, after which the loop returns to $r_0$, performing the calculation K times the sine wave cycle while accumulating the data.

In this case, if the number of data values read from the data table for one cycle is N and the number of times the same data is output is M, the complex amplitude of the frequency component of the reference signal in the tracking drive signal can be obtained by dividing the data accumulated after K cycles of the sine wave by (N×K×M÷2). The frequency of the reference signal at this time is 1/M the reference frequency during focus servo and tracking servo adjustment. This frequency approximates the frequency at which the tracking actuator gain and the traverse servo gain are equal. The traverse servo characteristics can be adjusted by performing the same calculations and adjustments from the detected complex amplitude as during focus servo and tracking servo adjustment.

In the above description, the same sine wave data table is used for focus servo and tracking servo adjustment and for traverse servo adjustment, but a distinct sine wave data table can also be used for traverse servo adjustment.

It is to be noted that because the stability of the servo loop is determined by the frequency characteristics near the gain crossover, it is important to obtain the frequency characteristics near the gain crossover. It is therefore effective to use, as the frequency for characteristics measurement, a frequency near the gain crossover where there is little disk address or other noise. Furthermore, because the loop gain is approximately 1 if the frequency of the reference signal is a frequency near the gain crossover frequency of the servo loop, the precision of the gain calculation and complex amplitude detection of the signal can be increased.

In addition, it is also possible to adjust only the gain in a servo circuit with low phase change, or to adjust only the phase characteristics in a servo circuit with low gain change.

Furthermore, by adjusting the gain and phase characteristics when the disk is loaded, it is also possible to compensate for the detection characteristics when the detection characteristics of the servo error signal vary with the disk. In addition, by performing the adjustment at a regular time interval, it is also possible to compensate for changes in the actuator characteristics and detection characteristics of the servo error signal caused by temperature changes.

Standard 86 mm optomagnetic disks have a calibration zone on the inside and outside circumferences, and these zones may also be used for adjustments because the characteristics thereof are typical of the read/write area of the disk. In addition, in a disk comprising a read/write area and a read-only area recorded with a pit and land signal, the gain can be measured in the high density track at the inside circumference of the disk and stored as a value typical of the read-only area, and the gain measured in the calibration zone can be stored as the characteristic typical of the read/write area of the disk, and these values can be selectively used in the read/write and read-only areas of the disk.

It is to be noted that so long as the reference signal applied to the servo loop is within the servo loop, it may be placed within the servo circuit or after the servo circuit. Furthermore, by storing the characteristics between the point where the reference signal is added and the point where the complex amplitude of the reference signal added in the servo loop is measured, the characteristics of the servo loop can be obtained by calculation insofar as the point where the complex amplitude of the signal is measured is in the servo loop.

The sine wave data table can be obtained by storing values for only a ½ or ¼ cycle of the sine wave signal, and the one cycle signal can be obtained from these divisions through calculation. For example, if the values for the first ½ cycle are stored, the signals can be output without modification for the first ½ cycle of the signal, and the signals for the second half cycle can be obtained by multiplying the first ½ cycle values by −1, thus making it possible to output values for one full sine wave cycle. In addition, if the values for the first ¼ cycle of the sine wave are stored, the values for the first ¼ cycle can be output without modification, the values for the next ¼ cycle can be inverted and output for the corresponding address in the next ¼ cycle, and the values for the second ½ of the cycle can be obtained by multiplying the values for the first ½ cycle by −1, thus making it possible to output values for one full sine wave cycle while storing the values for only ¼ cycle.

It is to be noted that a constant gain detection precision can be obtained by calculating the complex amplitude each time the reference signal is output one full cycle, obtaining the distribution of the complex amplitude of the reference signal in the detected servo loop, and measuring until the distribution divided by N is less than a preset value when the number of the detected complex amplitudes is N.

According to the present invention, the sinusoidal waveform signal generator 31 generates a sinusoidal waveform having a frequency which is approximately the same as a gain crossover frequency of the servo loop.

Also, the sinusoidal waveform signal generator 31 generates a sine waveform and cosine waveform for use in the orthogonal phase heterodyne detection.

Furthermore, the frequency of the sinusoidal waveform signal for reference signal and orthogonal phase heterodyne detection is varied by changing the data table read time.

Also, the frequency of the sinusoidal waveform signal for reference signal and orthogonal phase heterodyne detection is varied by changing the number of times the same data is read from the data table.

The gain characteristics (G) and the servo loop phase are calculated in DSP 30 at the time the disk is loaded, and preferably after every predetermined time interval repeatedly until the distribution of the detected signal complex amplitude is reduced lower than a predetermined value.

Furthermore, the gain characteristics (G) and the servo loop phase are calculated during the light beam spot irradiating at the disk read/write area and at the disk area where data is pre-recorded with a pit-land signal.

Preferably, the reference signal and orthogonal phase heterodyne detection are executed for multiple of one full cycle of a single frequency reference signal.

It is to be noted that the servo circuits may also be formed by a digital filter using, e.g., a DSP. The gain and phase characteristics in this case can be set by changing the coefficient of the digital filter.

It is also possible to further provide a RAM, having a same size as that used for the reference signal table, for periodically accumulating and storing the data read from the A/D converter so that after the data accumulation of M cycles (M being an integer) of the reference signal, the orthogonal phase heterodyne detection is carried out using the values form the reference signal table to calculate the complex amplitude of the signal.

In this case, it is preferable to obtain an average of the complex amplitude from reference signals calculated a plurality of times at an interval with a predetermined variation so that the gain detection can be effected with the noise signal having a frequency close to the frequency of the reference signal being eliminated.

As thus described hereinabove, an optical recording and playback device according to the present invention can automatically measure the servo loop gain and phase characteristics, and can achieve stable servo characteristics by adjusting the servo loop gain and phase characteristics to preset values.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. An optical recording and playback device for irradiating a light beam spot on a track of a data carrying medium at a target condition, comprising:
   servo error signal detection means for detecting a deviation of the light beam spot from the target condition and for generating a corresponding servo error signal;
   servo control means defining a servo loop with said servo error signal detecting means for moving the light spot to and holding the light spot at the target condition;
   reference signal generator for generating and applying a reference signal having a predetermined frequency to said servo loop;
   complex amplitude detection means for detecting a complex amplitude at said predetermined frequency of the servo error signal generated by said servo error signal detection means when the reference signal is applied to the servo loop by said reference signal generator;
   means for calculating a gain characteristics of the servo loop from the complex amplitude detected by the complex amplitude detection means and a complex amplitude at said predetermined frequency of the reference signal; and
   an adjustment means for changing the gain characteristic of the servo loop when the gain characteristic calculated by said calculating means deviates from a desired gain characteristic.

2. An optical recording and playback device as claimed in claim 1, further comprising:
   means for calculating a phase characteristic of the servo loop from the complex amplitude detected by the complex amplitude detection means and the complex amplitude at said predetermined frequency of the reference signal; and
   an adjustment means for changing the phase characteristic of the servo loop when the phase characteristic detected by said phase characteristic calculating means deviates from a desired phase characteristic.

3. An optical recording and playback device as claimed in claim 2, wherein said means for calculating a servo loop phase characteristic and said means for adjusting a servo loop phase characteristic are effected at the time the disk is loaded.

4. An optical recording and playback device as claimed in claim 2, wherein said means for calculating a servo loop phase characteristic and said means for adjusting a servo loop phase characteristic are effected after every predetermined time interval.

5. An optical recording and playback device as claimed in claim 2, wherein said means for calculating a servo loop phase characteristic and said means for adjusting a servo loop phase characteristic are effected at a disk read/write area and at a disk area where data is pre-recorded with a pit-land signal.

6. An optical recording and playback device as claimed in claim 2, wherein said means for calculating a servo loop phase characteristic and said means for adjusting a servo loop phase characteristic are effected repeatedly until the distribution of the detected complex amplitude is reduced to lower than a predetermined value.

7. An optical recording and playback device as claimed in claim 1, wherein said complex amplitude calculation means carries out orthogonal phase heterodyne detection.

8. An optical recording and playback device as claimed in claim 7, wherein said reference signal generator comprises a sinusoidal waveform signal generator for generating a sinusoidal waveform having a frequency at which is approximately the same as a gain crossover frequency of the servo loop.

9. An optical recording and playback device as claimed in claim 8, wherein said sinusoidal waveform produced from said sinusoidal waveform signal generator generates a sine waveform and cosine waveform for use in said orthogonal phase heterodyne detection.

10. An optical recording and playback device as claimed in claim 8, wherein said sinusoidal waveform signal generator is a memory table for storing one cycle pattern of a sine waveform.

11. An optical recording and playback device as claimed in claim 8, wherein said sinusoidal waveform signal generator is a memory table for storing one half cycle pattern of a sine waveform.

12. An optical recording and playback device as claimed in claim 8, wherein said sinusoidal waveform signal generator is a memory table for storing one fourth cycle pattern of a sine waveform.

13. An optical recording and playback device as claimed in claim 8, wherein the frequency of said sinusoidal waveform signal for noise signal and orthogonal phase heterodyne detection is varied by changing the data table read time.

14. An optical recording and playback device as claimed in claim 8, wherein the frequency of said sinusoidal waveform signal for reference signal and orthogonal phase heterodyne detection is varied by changing the number of times the same data is read from the data table.

15. An optical recording and playback device as claimed in claim 7, wherein said reference signal and orthogonal phase heterodyne detection are executed for multiple of one full cycle of a single frequency reference signal.

16. An optical recording and playback device as claimed in claim 1, wherein said means for calculating a gain characteristic of the servo loop and said means for adjusting a gain characteristic of the servo loop are effected at the time the disk is loaded.

17. An optical recording and playback device as claimed in claim 1, wherein said means for calculating a gain characteristic of the servo loop and said means for adjusting a gain characteristic of the servo loop are effected after every predetermined time interval.

18. An optical recording and playback device as claimed in claim 1, wherein said means for calculating a gain characteristic of the servo loop and said means for adjusting a gain characteristic of the servo loop are effected at a disk read/write area and at a disk area where data is pre-recorded with a pit-land signal.

19. An optical recording and playback device as claimed in claim 1, wherein said means for calculating a gain characteristic of the servo loop and said means for adjusting a gain characteristic of the servo loop are effected repeatedly until the distribution of the detected complex amplitude is reduced to lower than a predetermined value.

* * * * *